July 19, 1927.

G. A. JAEGER ET AL 1,636,000

MACHINE FOR FORMING LEATHERS FOR POOL POCKETS

Filed July 18, 1924   2 Sheets-Sheet 1

INVENTOR.
Gustav A. Jaeger and
August F. Jaeger,
BY Walter N. Haskell
their ATTORNEY.

July 19, 1927.
G. A. JAEGER ET AL
1,636,000
MACHINE FOR FORMING LEATHERS FOR POOL POCKETS
Filed July 18, 1924 2 Sheets-Sheet 2
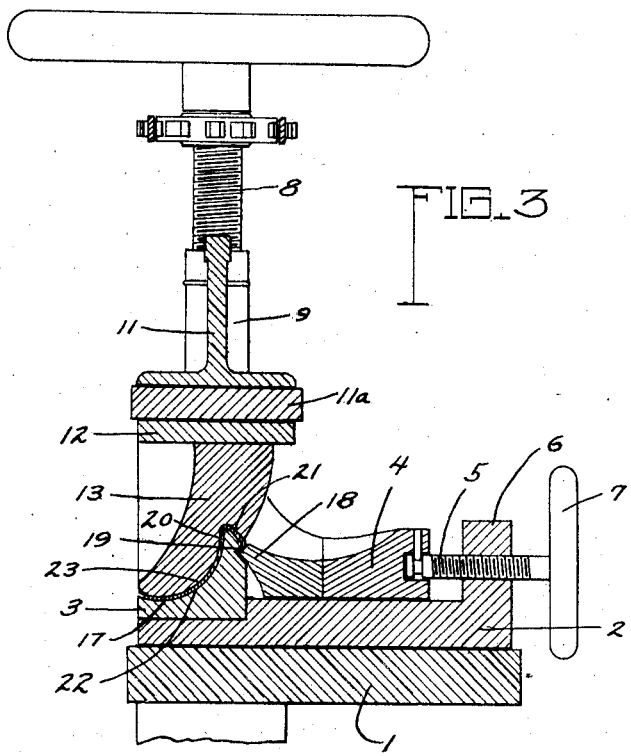
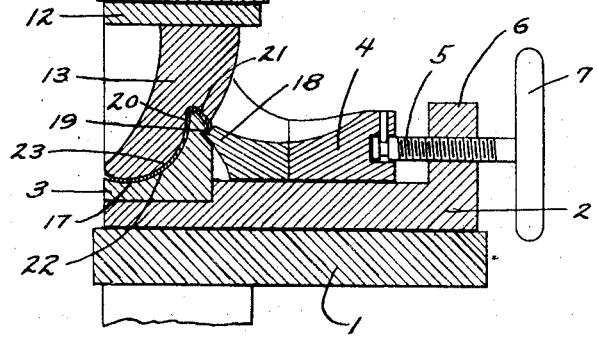
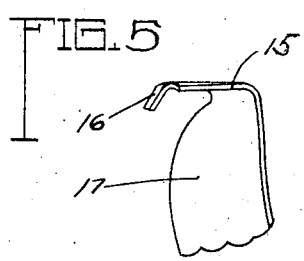
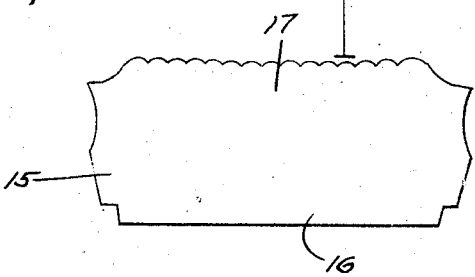
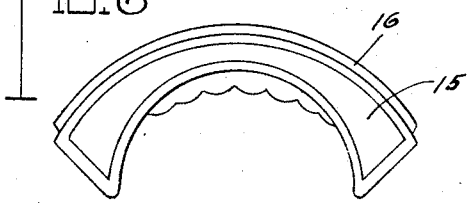
INVENTOR.
Gustav A. Jaeger and
BY August F. Jaeger,
Walter N. Haskell,
their ATTORNEY.

Patented July 19, 1927.

1,636,000

UNITED STATES PATENT OFFICE.

GUSTAV A. JAEGER AND AUGUST F. JAEGER, OF MORRISON, ILLINOIS, ASSIGNORS TO PERFECT POOL POCKET IRONS COMPANY, OF MORRISON, ILLINOIS.

MACHINE FOR FORMING LEATHERS FOR POOL POCKETS.

Application filed July 18, 1924. Serial No. 726,886.

Our invention has reference to a machine for forming pool pocket iron leathers and similar devices, such leathers being interposed between the pocket and the ball entering the same, to receive the impact of the blow of such ball. As these shields are frequently badly worn by use, it is found to be desirable to have the same interchangeable, in the manner set forth in the former patent of the United States issued to said Gustav A. Jaeger, Sept. 28, 1915, and numbered 1,154,865, and the type of shield for which the present machine is more specially designed is shown in the drawings therein. These shields, or leathers, are of a peculiar formation, and in producing the same it is necessary to distort the leather from which they are formed, and which is formed of comparatively thick material, out of its usual flat character. This is accomplished by a series of operations, the material being first stamped or cut into pieces of the desired shape, after which one edge thereof is clamped tightly in place, and pressure applied to the remainder of the leather to reduce the same to the desired shape.

In the drawings:

Fig. 3 is a longitudinal vertical section of the machine.

Fig. 4 shows one of the leathers which is formed in the machine, in blank form.

Fig. 5 is an end view thereof, after being formed, looking from the left of Fig. 6.

Fig. 6 is a plan view thereof.

Figure 1:
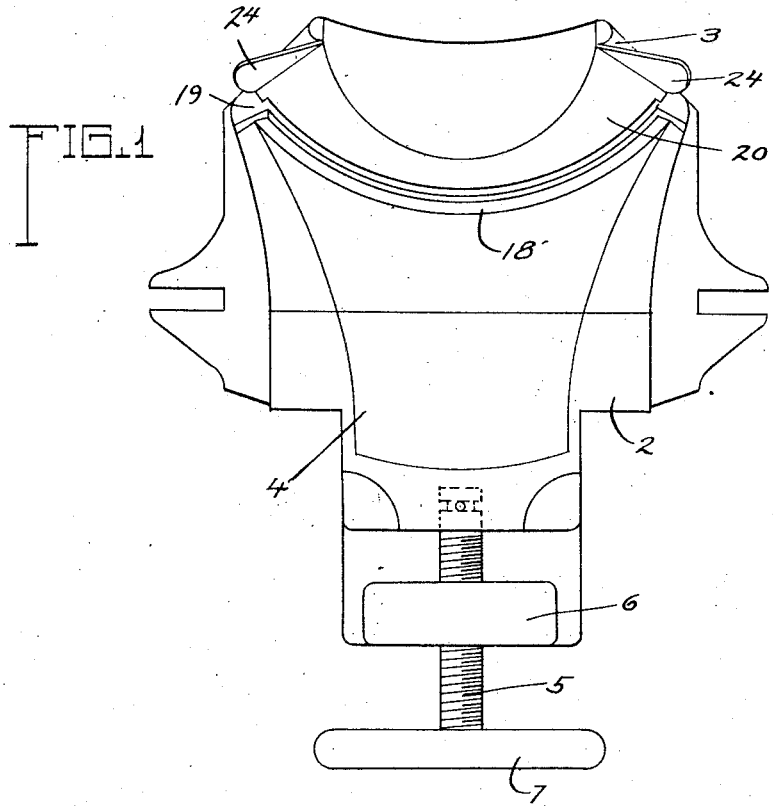
Fig. 1 is a plan view of the machine, with the press mechanism removed.
Figure 2:
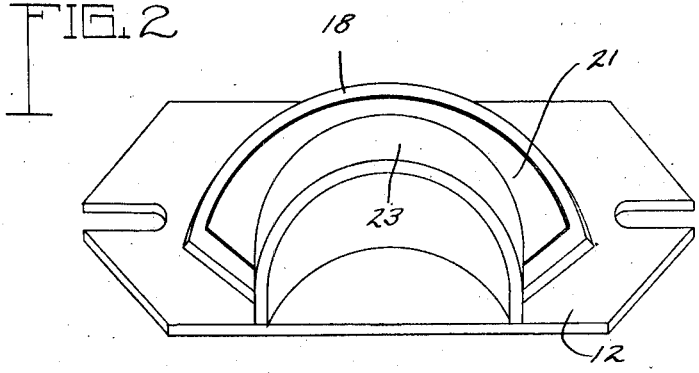
Fig. 2 is an inverted view of the upper die 13.

The reference number 1 indicates a table or bed-plate upon which the machine is mounted, and 2 the base-plate of the machine, at one edge of which is fixed a die-block 3, and supported on the plate 2, so as to be movable toward or from the block 3, is a die 4. Movement may be imparted to the die 4 by means of a screw 5, connected therewith at its inner end, and operable in a bearing 6 on the end of the plate 2. The outer end of the screw 5 is provided with a hand-turn 7, by means of which the same may be operated.

Above the machine is mounted a press mechanism of a common type, as shown in section in Fig. 3, comprising a pair of rotatably mounted screws 8, upon which are vertically movable sleeves 9. united by a crosshead 11, carrying a cross-plate 11ª, to which is secured a plate 12. Fixed to the lower face of the plate 12 is a die 13, conforming in shape to that of the upper face of the die-block 3.

A common form of detachable shield is shown in Figures 4 to 6, inclusive, in which 15 is the body or collar portion, 16 a downwardly turned flange, for engagement with the iron of the pocket, and 17, the valence, which projects downwardly into the pocket, and acts as a guard therefor. In forming the leather the part 16 is first clamped tightly between a curved die 18 on the end of the member 4 and a similarly curved face 19 on the block 3. The leather is then bent over the upper edge of the block 3, and the die 13 moved downwardly, the part 15 being pressed between opposing faces 20 on the block 3, and 21 on the die 13. At the same time the valence 17 is formed between opposing faces 22 and 23 on the block 3 and die 13, respectively. To secure better results in forming the leather, and in causing the same to retain its shape after being formed, such leather is soaked in water or other liquid before being operated upon.

At the ends of the face 20 are angular wings 24, which assist in forming the part 15 of the leather, preventing the material from crowding out at the ends in the forming operation, and doing away with the necessity of cutting or trimming the ends of the part 15 after the shield is formed.

The various die members are all preferably mounted so as to be readily detached, and replaced by other parts. Dies of various sizes and shapes can thereby be employed, to conform to the various requirements of the different styles of pockets and tables.

It will be understood that changes can be made in the construction of the various parts of the machine, including the special forms of the dies, without departing from the spirit of the invention.

What we claim, and desire to secure by Letters Patent, is:

In a machine for the formation of a pool pocket iron leather, including a body portion and appended parts, a suitable base-plate; a die-block fixed thereon, and provided with faces assisting in the formation of said body portion and appended parts;

wing members at the ends of said body forming face, limiting the movement outwardly of the material contained therein; a die member movable with relation to one of the other faces thereof, and means for giving thereto a clamping action, the engaging face of said movable member conforming to that of said fixed member; and a movable die member and means for causing the same to engage said fixed member under force, the engaging face thereof conforming to the adjacent face of said fixed member.

In testimony whereof we affix our signatures.

AUGUST F. JAEGER.
GUSTAV A. JAEGER.